United States Patent

Peterson

[15] 3,659,835

[45] May 2, 1972

[54] IMPACT KINETIC ENERGY ABSORBER WITH AUTOMATIC RESET

[72] Inventor: Gerald H. Peterson, 520 Russ Bldg., San Francisco, Calif. 94104

[22] Filed: Oct. 12, 1970

[21] Appl. No.: 79,722

[52] U.S. Cl. ..............................267/136, 267/134, 267/176
[51] Int. Cl. .............................................................F16f 9/30
[58] Field of Search ..........................267/136, 134, 176, 116

[56] References Cited

UNITED STATES PATENTS

| | | | |
|---|---|---|---|
| 2,460,116 | 1/1949 | Bazley | 267/134 |
| 3,053,526 | 9/1962 | Kendall | 267/134 |

Primary Examiner—James B. Marbert
Attorney—Gregg, Hendricson & Caplan

[57] ABSTRACT

In impact kinetic energy absorber with automatic reset in which the kinetic energy on impact is absorbed by forcing a plunger with an enlarged head through plastic material within a cylinder under pressure below the yield point of the plastic material so that said plastic material is in solid form and which has a resilient means operatively arranged between said plunger and said cylinder sufficiently loaded therebetween to force said plunger with enlarged head back through said plastic material in solid form to reset said impact absorber after impact and to absorb some kinetic energy on impact in addition to that absorbed by forcing said plunger through said plastic material.

4 Claims, 1 Drawing Figure

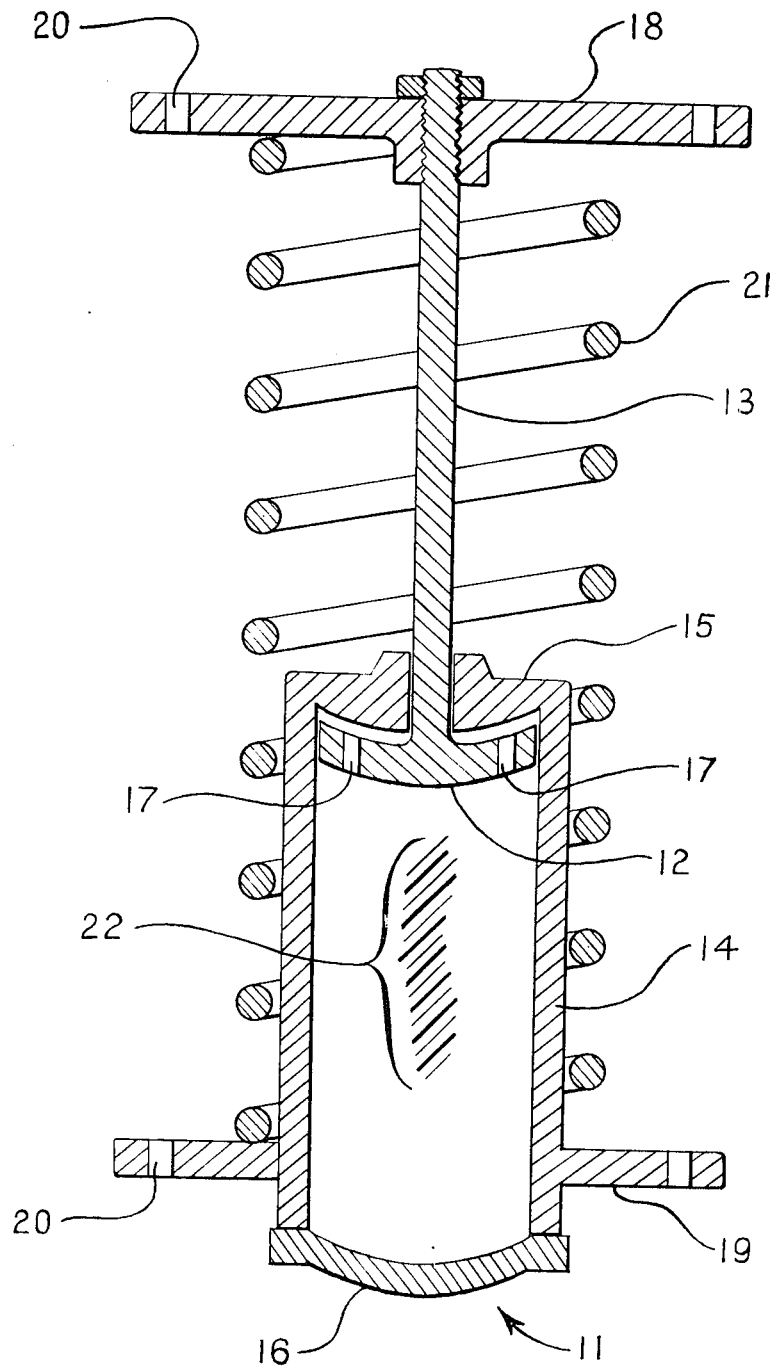

IMPACT KINETIC ENERGY ABSORBER WITH AUTOMATIC RESET

The invention relates to an impact kinetic energy absorber in which the kinetic energy of impact is absorbed by forcing a plunger with an enlarged head through plastic material within a cylinder under pressure below the yield point of the plastic material so that the plastic material is in its solid form having means for automatically setting said absorber after impact and for absorbing kinetic energy in addition to that absorbed by forcing said plunger with enlarged head through said plastic material.

It is an object of this invention to provide an impact kinetic energy absorber in which kinetic energy is absorbed by forcing a plunger with an enlarged head through plastic material in a cylinder under pressure below the yield point of the plastic material which has means for automatic reset operative also on return after impact with the plastic material under pressure below its yield point so that said plastic material is in its solid form during reset without having the plastic material under pressure in the cylinder greater than its yield point and hence in the form of a viscous liquid.

It is another object of this invention to provide an impact kinetic energy absorber having automatic reset and described above in which said means for automatic reset on impact absorbs kinetic energy in addition to that absorbed by forcing said plunger through said plastic material.

Other objects of this invention will be apparent from the description of the specific embodiment set out below.

In general, the impact kinetic energy absorber of my invention absorbs kinetic energy on impact by forcing a plunger with an enlarged head through plastic material in a cylinder under pressure below the yield point of the plastic material so that said plastic material is in its solid form except for that portion of the plastic material which is forced by said plunger head and has a resilient means operatively arranged between said plunger and said cylinder sufficiently loaded to force said plunger with enlarged head to reset by forcing said plunger back through said plastic material in its solid form except for that portion of the plastic material which flows past said plunger head and said resilient means also in impact absorbing kinetic energy in addition to that absorbed by said plastic material as said plunger head is forced therethrough.

Related prior art is illustrated by my U.S. Pat. No. 2,997,325, issued Aug. 22, 1961 and U.S. Pat. No. 3,053,526, to G. A. Kendall, issued Sept. 11, 1962, especially the devices shown in FIGS. 8 and 10. The prior art devices absorb kinetic energy of impact by forcing plastic material through an orifice, but they do not disclose a means for returning the operating plunger to its initial position for reset with the plastic material being under pressure below its yield point so that said plastic material is in its solid form except for a portion thereof being forced past said plunger head on the return stroke.

A specific embodiment of my invention is described in detail hereinafter as illustrated in the accompanying drawings, in which:

The FIGURE is a schematic showing of a section of such embodiment taken on the longitudinal axis thereof.

The FIGURE of the drawing is a schematic sectional showing of an embodiment of the invention taken on the longitudinal axis of a closed cylinder 11, piston 12 and piston rod 13. The cylinder 11 has side walls 14 of tubular form and dished ends 15, 16. The piston 12 is dish-shaped, guided by the inner wall of the cylinder 11, and has formed therearound and therethrough openings 17 that provide for flow of the plastic material between the faces of the piston. As shown, the piston is in its retracted position against a cylinder head 15 that is inwardly dished with the concave surface of the piston against the convex surface of such head. The other head 16 of the cylinder is outwardly dished and the piston travels between the two heads. The piston rod 13 is secured to and centrally of the piston 12, and extends through, is movably guided in, and closes an opening in the head 15. The piston rod 13 is just of a length to allow such travel between the heads 15, 16. It is preferred that the piston rod 13 have as small a diameter as practicable to avoid decreasing the space available for the plastic material and thus increase the pressure unduly on the plastic material when the rod is fully extended into the cylinder.

The outer end of the piston rod has a circular plate 18 secured thereto with its flat surfaces normal to the axis of the rod 13. Secured to the outer end of the cylinder 11 adjacent the outwardly dished head is a flat ring 19 that has its flat surfaces normal to the axis of the cylinder and the piston rod. Thus, the two plates 18, 19 are parallel. The plates 18, 19 have the same outer diameters and may be provided with bolt holes 20 therethrough for the reception therethrough of bolts for securing the device in a desired location.

A cylindrical helical spring 21, resilient means, is placed between and bears against the opposed faces of the plates 18, 19. The spring 21 and cylinder 11 are coaxial, with the diameter of the spring being such as to be close to the outer diameter of the cylinder. The number of turns of the spring are such that the spring is substantially fully compressed when the piston 12 is fully extended, adjacent the outer end 16. The strength of the spring, size and type of wire, are a function of the operating characteristics of the device as further described.

The free volume, space, in the cylinder 11 is filled with a plastic material 22 under pressure below its yield point so that it is in its solid form. Many plastic materials may be used depending on the requirements of the particular case, for example, silicone rubber, polyethylene, etc.

The spring 21 has as its main purpose the return of the piston 12 to its retracted position against the head 15 from any extension from such head. That is, return from any position between the heads 15, 16. For this to occur, in the retracted position of the piston, against the head 15, the spring must load the piston so as to force its return through the plastic material under pressure below its yield point and hence in its solid form except only that portion of the plastic material which is forced to flow through the openings 17.

A secondary function of the spring is to absorb some of the kinetic energy that may be applied to the device to force the plates 18, 19 together, and then to transfer such energy to the plastic as the piston 12 retracts to its initial position against the head 15. Thus, the absorbed kinetic energy transfer to the plastic occurs during both extension and retraction of the piston.

In use the device is located in a position to receive axially thereof against the plates 18, 19 impacts that move the piston 12 from its shown retracted position. On impact the piston is forced through the plastic material to absorb kinetic energy. Also, this extension of the piston on impact transfers energy to compress the spring 21. From such extended position the piston is retracted by the stored energy of the spring to its initial position. However, as discussed above, the initial loading of the spring before impact must be sufficiently great to force the piston to move through the plastic material in its solid form so that it will be fully retracted after impact with the plastic material under pressure below its yield point so that it is in its solid form except only for that portion of the plastic material forced to flow through orifices 17 during retraction.

I claim:

1. In a device for absorbing kinetic energy of impact in which kinetic energy is absorbed by forcing a plunger with an enlarged head through plastic material in a cylinder under pressure below the yield point of the plastic material so the said plastic material is in its solid form except for that portion thereof forced to flow past said enlarged head during impact, the improvement which comprises resilient means operatively arranged between said plunger and said cylinder sufficiently loaded to force said plunger with said enlarged head back through said plastic material under pressure below its yield point so that said plastic material is in its solid form except that portion thereof flowing past said enlarged head as said resilient means forces said plunger back to its original position before impact.

2. In a device as defined in claim 1 in which said resilient means in a spring.

3. In a device as defined in claim 1 in which said resilient means is compressed between the plunger and said cylinder.

4. In a device as defined in claim 3 in which said resilient means is a spring.

* * * * *